No. 853,205. PATENTED MAY 7, 1907.
A. MIERSCH.
MOTOR PLOW.
APPLICATION FILED NOV. 28, 1904.

Witnesses:
C. H. ̲̲̲
Gustav Heyd

Inventor:
Albert Miersch
by Paul E. Schilling
his attorney

UNITED STATES PATENT OFFICE.

ALBERT MIERSCH, OF BRESLAU, GERMANY, ASSIGNOR TO THE FIRM OF GEBRUEDER ALEXANDER, OF BRESLAU, GERMANY.

MOTOR-PLOW.

No. 853,205.  Specification of Letters Patent.  Patented May 7, 1907.

Application filed November 28, 1904. Serial No. 234,665.

*To all whom it may concern:*

Be it known that I, ALBERT MIERSCH, a subject of the German Emperor, and residing at Breslau, Germany, have invented certain new and useful Improvements in Motor-Plows, of which the following is a specification.

My invention relates to improvements in plows driven by explosive-engines traveling with the plow over the field, and is more particularly adapted for gang-plows, though also applicable to those of the single-share type.

The object of this invention is to provide a plow in which the shares are so arranged between the front and rear axles of the frame that both axles are equally weighted, that is, the downward pull upon the frame caused by the inclined shares entering the soil, will be taken up equally by the axles. The plow shares being vertically adjustable in the frame, this pull upon the frame will be varied according to the number of shares and the depth to which they enter the soil.

My invention is illustrated in the accompanying drawing, in which

Figure 1:
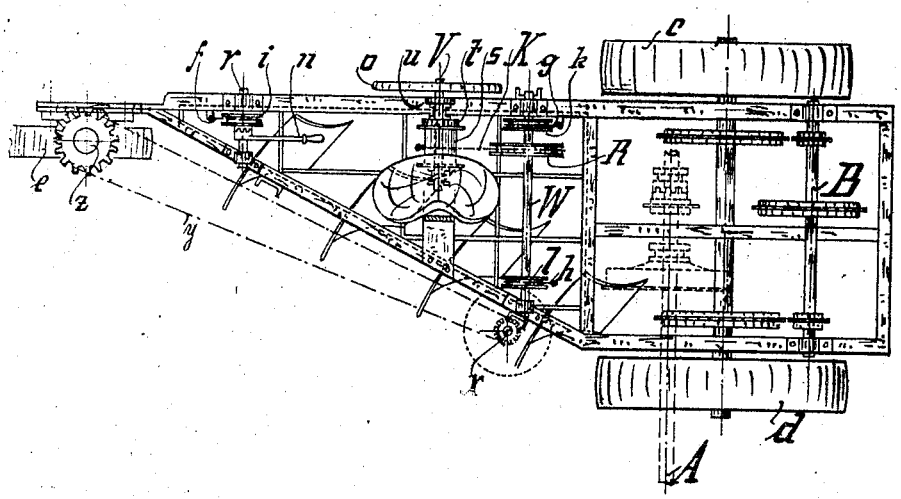
Figure 2:
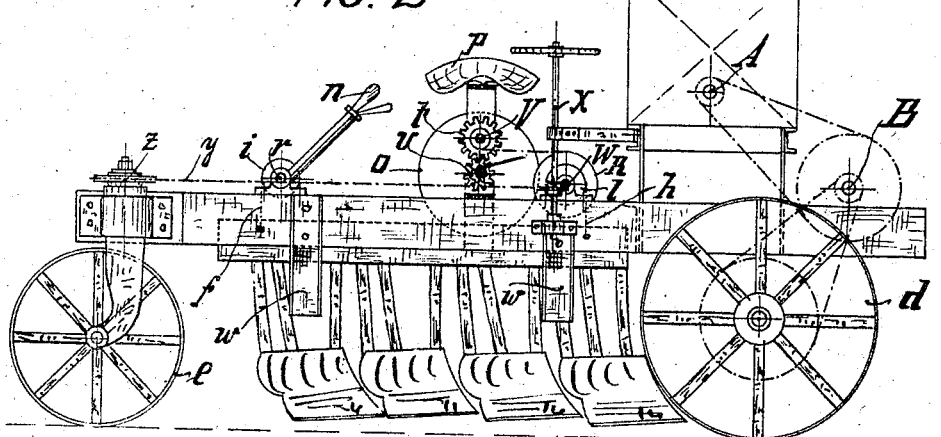

Figure 1 shows a plan, and Fig. 2 a side elevation of the new plow.

The frame $a$, which carries the explosive-engine $m$ and the plow made up of a triangular frame carrying shares $b$, is mounted on three wheels. The front wheels $c$ $d$ have a common axle, which is driven in well-known manner by the engine, and rests in stationary bearings, while the hind wheel $e$ turns pivotally with its bearings. The wheel $c$ runs on the land, while $d$ and $e$ run in the furrow.

The plow is mounted with capability of vertical adjustment and of ready removal, in the suitably shaped part of the frame which lies between the two axles. In the particular form of plow illustrated, this adjustable plow-body having uniformly distributed shares is suspended by chains $f$, $g$, $h$ shown in dotted lines which pass over the pulleys $k$, $l$ and can be lengthened or shortened by means of the lever $n$ and handwheel $o$, accessible from the driver's perch $p$. The chain $f$ is for this purpose secured to the pulley $i$ mounted on the shaft $r$, and the chains $g$, $h$, to the pulleys $k$, $l$ mounted on the shaft $W$, while the pulley $R$, mounted on the latter shaft $W$, is connected by a chain $K$ with a drum $s$ mounted on the shaft $V$, the toothed wheel $t$ of which drum meshes with the pinion $v$ mounted on the shaft $u$, so that by throwing over the lever $n$ and turning the hand-wheel $o$ in one direction or the other, the chains are caused to wind up or unwind respectively, whereby the plow is elevated or sunk, that is to say, its shares caused to leave the ground or descend to it. Naturally the shares may also be vertically adjusted, to suit the character of the soil, during plowing, if desired; and plowing may be started without the furrow-wheels being first adjusted. The bars $w$ secured to the outside of the frame impart the necessary guidance to the plow-body so that the shares are prevented from vibrating. The hind-wheel $e$ is turned by the spindle $x$, accessible from the perch $p$, the motion being transmitted by a chain $y$ to the pivoted frame $z$ which carries the bearings of the wheel $e$.

The main shaft $A$ of the engine $m$ drives the counter-shaft $B$, from which, again, the axle of the front wheel is driven. The method of mounting the plow between the two axles has the advantage that on the shares entering the ground, a uniform pull is exerted on all the wheels, which pull is increased or diminished depending upon the depth to which the shares enter the soil, so that it regulates the friction of the wheels necessary for the utilization of the engine power. Since the plow is removable, the full power of the engine can always be utilized, in so far that plow-bodies with a greater or less number of shares may be used, depending upon the nature of the soil.

It must be understood that I in no wise desire to restrict myself to the precise details of construction shown, as these may be greatly varied without departure from the essential features of my invention.

What I claim is:—

A motor plow comprising a rectangular main portion, wheels and axles supporting it, a triangular extension frame at the front of the motor frame, a swivel wheel supporting the front of the triangular extension, a body frame vertically guided on the motor frame, independent pulleys carried by the motor frame at front and rear respectively, chains attached to the body frame and secured to said pulleys, means within reach of the driver for independently turning and securing said pulleys, and plow shares supported by and uniformly distributed over said body frame, substantially as described.

In testimony whereof I affix my signature in presence of two witnesses.

ALBERT MIERSCH.

Witnesses:
 FRANK KATZ,
 ALBERT SCHENK.